United States Patent
Wang et al.

(10) Patent No.: US 11,397,706 B2
(45) Date of Patent: Jul. 26, 2022

(54) SYSTEM AND METHOD FOR REDUCING READ AMPLIFICATION OF ARCHIVAL STORAGE USING PROACTIVE CONSOLIDATION

(71) Applicant: VMware, Inc., Palo Alto, CA (US)

(72) Inventors: Wenguang Wang, Santa Clara, CA (US); Hardik Singh Negi, Sunnyvale, CA (US); Junlong Gao, Vancouver (CA); Vamsi Gunturu, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 43 days.

(21) Appl. No.: 17/131,155

(22) Filed: Dec. 22, 2020

(65) Prior Publication Data
US 2022/0197861 A1 Jun. 23, 2022

(51) Int. Cl.
*G06F 16/11* (2019.01)
*G06F 16/18* (2019.01)
*G06F 16/2455* (2019.01)
*G06F 16/23* (2019.01)
*G06F 16/22* (2019.01)

(52) U.S. Cl.
CPC ........ *G06F 16/128* (2019.01); *G06F 16/1805* (2019.01); *G06F 16/22* (2019.01); *G06F 16/2358* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 9,740,609 | B1* | 8/2017 | Ahmed | G06F 12/0246 |
| 2015/0134616 | A1* | 5/2015 | Zheng | G06F 11/1464 |
| | | | | 707/639 |
| 2016/0077746 | A1* | 3/2016 | Muth | G06F 3/0644 |
| | | | | 711/159 |
| 2017/0329541 | A1* | 11/2017 | Hayasaka | G06F 12/0811 |
| 2020/0210087 | A1* | 7/2020 | Mannaly | G06F 3/0604 |

(Continued)

OTHER PUBLICATIONS

Gao, Junlong et al. "BOSSFS: An Enterprise File Service as Fast as vSAN and as Cheap as S3", Jun. 1, 2018, 9 pgs.

(Continued)

*Primary Examiner* — Christopher J Raab
(74) *Attorney, Agent, or Firm* — Loza & Loza, LLP

(57) ABSTRACT

System and method for managing snapshots of storage objects in a storage system use a consolidation operation to reduce read amplification for stored snapshots of a storage object that are stored in log segments in the storage system according to a log-structured file system as storage service objects. The consolidation operation involves identifying target log segments among the log segments that include live blocks that are associated with the latest snapshot of the storage object and determining the number of the live blocks included in each of the target log segments. Based on the number of the live blocks in each of the target log segments, candidate consolidation log segments are determined from the target log segments. The live blocks in the candidate consolidation log segments are then consolidated to new log segments, which are uploaded to the storage system as new storage service objects.

20 Claims, 10 Drawing Sheets

(56) References Cited

U.S. PATENT DOCUMENTS

2021/0181977 A1* 6/2021 Han ..................... G06F 3/0683

OTHER PUBLICATIONS

Wang, Wenguang et al. "D3FS: A Distributed File System Supporting Data Deduplication at Global Scope", May 15, 2019, 7 pgs.
VMware, "DR BOSS Architecture Review", https://confluence.eng.vmware.com/display/vSphereDP/DR+BOSS+Architecture+Review, downloaded Jan. 13, 2021, 8 pgs.
Wang, Wenguang, "LSOM 2 Schema Proposal", https://confluence.eng.vmware.com/display/VSAN/LSOM+2+Schema+Proposal, downloaded Jan. 13, 2021, 6 pgs.
Ongaro, Diego et al. "In Search of an Understandable Consensus Algorithm (Extended Version)", published May 20, 2014, 8 pgs.
Tang, Siddon, "How TiKV uses 'Lease Read' to Guarantee High Performance, Strong Consistency and Linearizibilty", PingCap, Nov. 14, 2018, 4 pgs.
Verbitski, Alexandre et al. "Amazon Aurora: Design Considerations for High Throughput Cloud-Native Relational Databases", SIGMOD '17, Chicago, IL, May 14-19, 2017, 12 pgs.

* cited by examiner

| Segment Usage Table (SUT) 400 | |
|---|---|
| Segment Index 402 | Live Count 404 |
| 0 | 40 |
| 1 | 99 |
| 2 | 4 |
| 3 | 0 |
| 4 | 0 |
| 5 | 0 |
| 6 | 3 |
| 7 | 0 |
| 8 | 7 |
| ... | ... |
| N | 38 |

FIG. 4

SYSTEM AND METHOD FOR REDUCING READ AMPLIFICATION OF ARCHIVAL STORAGE USING PROACTIVE CONSOLIDATION

BACKGROUND

Archival storage of large amounts of data is used for backups and disaster recovery, for example, fail-over from a primary software defined data center (SDDC) to a secondary SDDC. However, managing the storage of large amounts of data efficiently, in terms of access time, resource utilization, and financial costs, may depend heavily on the schema used. For example, various storage solutions may charge different rates for the volume of storage reserved or used but, in exchange, provide different access speeds. Additionally, some storage solutions may charge based on the access activity, such as writing and reading.

When versioned storage objects, such as virtual machine disks (VMDKs), and their snapshots are backed up to a cloud-based storage service in a public cloud storage for archival storage, read amplification is of concern due to fragmented stored data. As new snapshots are added to the cloud-based storage service, the latest snapshot of a versioned object tends to become more and more fragmented. When recovery is needed, the latest snapshot often needs to be read and, if the snapshot is highly fragmented, the recovery time can be significantly increased since more data needs to be read. Thus, it is highly desirable to reduce such read amplification as much as possible to reduce the recovery time.

BRIEF DESCRIPTION OF THE DRAWINGS

FIG. 4 illustrates a segment usage table (SUT), which is used in the distributed storage system, in accordance with an embodiment of the invention

Throughout the description, similar reference numbers may be used to identify similar elements.

DETAILED DESCRIPTION

Figure 1:
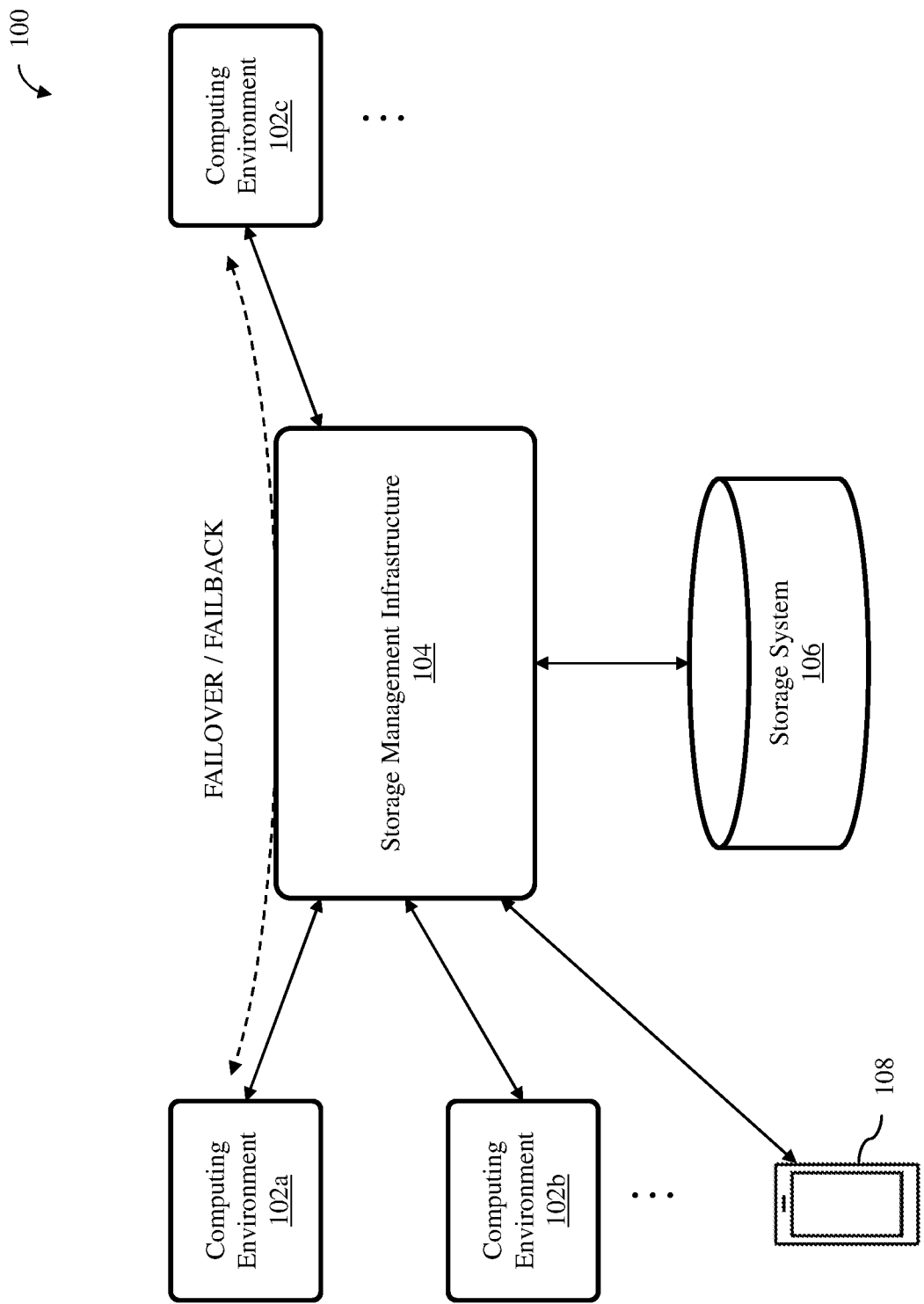
FIG. 1 is a block diagram of a distributed storage system in accordance with an embodiment of the invention.

FIG. 1 illustrates a distributed storage system 100 for managing storage of data in accordance with an embodiment of the invention. As shown in FIG. 1, the distributed storage system 100 includes a number of computing environments 102 (such as computing environments 102a, 102b, 102c ... ), a storage management infrastructure 104 and a storage system 106. The computing environments 102 may be software-defined data centers (SDDC) that may reside in one or more on-premises platforms or in one or more public clouds, such as Amazon Web Services (AWS) cloud and/or Microsoft Azure cloud. Data from at least some of the computing environments 102 are stored in the storage system 106 in a log-structured format for backup and recovery. The storage system 106 may be a cloud-based storage system, such as AWS storage or Azure storage, which may provide storage resources as a service.

The storage management infrastructure 104 manages uploading data to and retrieving data from the storage system 106, where the data includes snapshots of storage objects, such as virtual machine disk (VMDK) snapshots and snapshots of virtual storage area network (SAN) distributed file system (VDFS) volumes. In particular, the storage management infrastructure 104 manages uploading snapshots from primary computing environments to the storage system 106 and recovering the stored snapshots from the storage system 106 to secondary or backup computing environments. For example, in the distributed storage system 100 shown in FIG. 1, the computing environments 102a and 102b may be primary SDDCs and the computing environment 102c may be a secondary or backup SDDC. Thus, in this example, the storage management infrastructure 104 manages uploading snapshots from the computing environments 102a and 102b to the storage system 106 and manages recovering the stored snapshots from the storage system 106 to the computing environment 102c for failover operations. In some embodiments, the storage management infrastructure 104 may also manage failback operations for the primary SDDCs.

In some embodiments, the storage management infrastructure 104 may also manage snapshots from a user device 108, which may be a mobile user device (e.g., a smartphone, a laptop computer or a tablet) under the control of a mobile device management system that leverages the storage management infrastructure 104 for backup and restoration options.

The storage management infrastructure 104 may be implemented on one or more computer systems that include memories and processors, as well as other components commonly found in server grade computers. Although the storage management infrastructure 104 is illustrated in FIG. 1 as being implemented as a single unit separate from the storage system 106, the storage management infrastructure 104 may be implemented in the storage system 106 in some embodiments. In other embodiments, the storage management infrastructure 104 may be implemented in other environments, such as on-premises computing environments.

Figure 2:
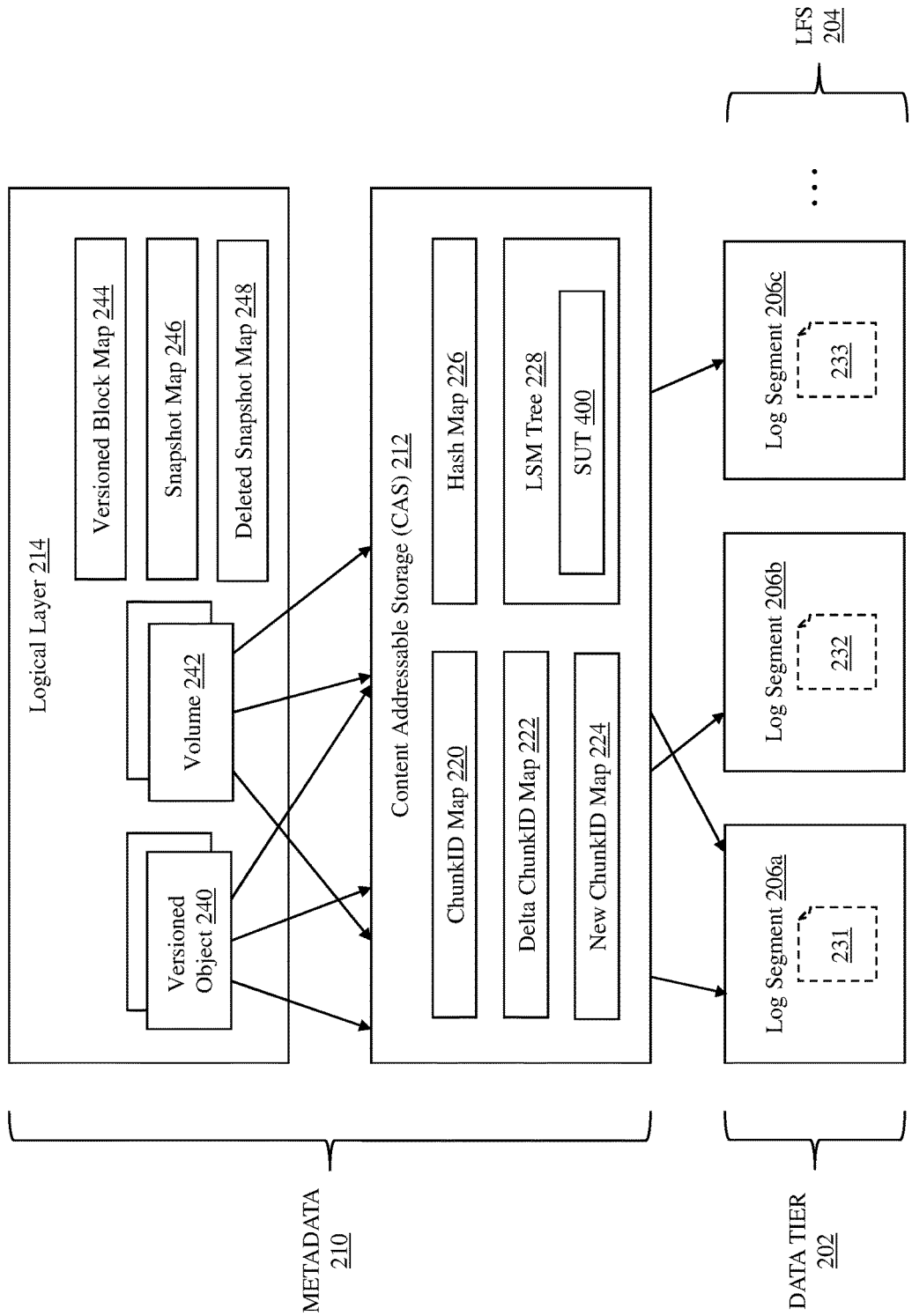
FIG. 2 illustrates a high-level overview of a tiered structure to store snapshots of storage objects in a log-structured format, which is used in the distributed storage system, in accordance with an embodiment of the invention.

FIG. 2 illustrates a high-level overview of a tiered structure 200 to store snapshots of storage objects in a log-structured format, which is used in the distributed storage system 100. As shown in FIG. 2, the tiered structure 200 includes a data tier 202 and a metadata tier 210. The data tier 202 is a transaction log implemented as a log-structured file system (LFS) 204. The metadata tier 210 includes a content-addressable store (CAS) 212 and a logical layer 214, giving the tiered structure 200 three tiers. Some common commercial object storage solutions have unique properties relative to traditional storage, including no overwrite and input/output (I/O) transaction cost. Once an object is written, it can no longer be partially overwritten or appended. And in some scenarios, each read/write transaction is charged regardless of its size. The no-overwrite property pushes toward smaller objects to allow easy modification, whereas the transaction cost pushes toward larger objects to reduce the number of separate transactions. The distributed storage system 100 is designed to avoid overwriting data while storing small updates into larger objects to reduce transaction costs.

A log is a data structure that may often meet both of these goals, by writing a series of large log segments out in order. It avoids overwriting live old segments and its segment size may be selected to be sufficiently large (e.g., 4 MB) such that transaction costs are minimized. Thus, the tiered structure 200 uses a log as its fundamental building block. Because metadata and data have different properties, they are managed using different log-based data structures. For example, bulk data is managed by the log-structured file system (LFS) 204, whereas the metadata tier 210 (more specifically, the CAS 212) uses a log-structured merge tree (LSM tree) 228, and contains indexing for data deduplication. The logical layer 214 represents storage objects, such as versioned objects 240 and volumes 242, and their snapshots. In some implementations, each of the versioned objects 240 include a 48-bit object identifier (objID), a list of snapshots, and block-level differences at 4 KB granularity. In some examples, an object name is <objID>-<sequenceID>, so that all blocks uploaded for the same object (e.g., VMDK) may be located easily. Each snapshot is a version of an object (or a volume).

In some examples, the LFS 204 comprises a series of 4 MB objects, where each object forms a linear order by embedding a timestamp in a key of the object. Since multiple sources may upload to the same LFS 204 concurrently, a unique identifier (ID) may be assigned to each source, and the key of each log segment (e.g., log segment 206a, log segment 206b, or log segment 206c) may be set to log/<timestamp>-<ID>/data, in some examples. The portion of the key string preceding "/data" is referred to as a prefix and, in some examples, the distributed storage system 100 may support several thousand input/output (I/O) transactions per second for each object with a different prefix. By providing different log segments with different prefixes, the LFS 204 may be randomly read with enhanced speed. In some examples, it is possible to range scan the log segments based on keys by using a start-after argument of a ListObjects command. This allows log segments to be efficiently scanned in order when needed. For example, as illustrated in FIG. 2, the log segment 206a holds a snapshot 231, the log segment 206b holds a snapshot 232, and the log segment 306c holds a snapshot 233. Thus, any of these snapshots may be readily located in the data tier 202.

The LFS 204 is managed, in part, by a segment usage table 400 included in the CAS 212, which includes information regarding log segments and live blocks in the log segments. In some implementations, the segment usage table 400 has one integer per segment indicating the number of live blocks in the log segment. The segment usage table 400 may also indicate the total number of blocks in each segment. The SUT 400 may be stored in the LSM tree 228 as key-value pairs. The SUT 400 summarizes the amount of available space left in each log segment (e.g., the log segments 206a-206c) and may be used to ascertain which log segments are suitable candidates for segment cleaning (garbage collection). Segment cleaning is described in detail below with respect to FIG. 8.

The LSM tree 228 comprises a write-optimized data structure that maintains multiple levels of larger sorted tables, for example, 300 Mb, 3 GB, 30 GB, and 300 GB, as an exponential four-level LSM tree. The LSM tree 228 may be structured to minimize write amplification for random updates, and each level may be a log. The CAS 212 sitting between the logical layer 214 and the LFS 204 in the data tier 202 serves multiple purposes simultaneously. This arrangement permits deduplication operations to locate data by content, and adds a level of indirection to allow the LFS 204 to move data efficiently during segment cleaning. A hash function (e.g., secure hash algorithm 256 (SHA-256)) may be used as the content hash so that any blocks with identical hash values stored in a hash map 226 in the CAS 212 may be identified as duplicates. This also enables the CAS 212 to locate any block in the LFS 204 when provided its hash value, facilitating data deduplication. Data deduplication may be performed inline and/or offline. Inline deduplication performs deduplication on the write path directly so that less data is written initially, thereby implementing network acceleration.

However, because hash values are randomly distributed, the CAS 212 also includes a chunkID (chunk identification) map 220 to improve caching. In some examples, chunkIDs in the chunkID map 220 are sequentially allocated for locality and are stored together in LSM tree 228. In some implementations, a chunkID may be 8-bytes, separated into two address spaces, identified by the highest bit: <isMetadata(1), id(63)>. When storing VDFS metadata, the logical variable isMetadata is true. Such chunkIDs are unique and can be overwriteable. Variable size chunking with a content-based chunk boundary may be used to chunk files into variable size chunks, and the CAS 212 may store variable size chunks in the same way as other block-based content. In some examples, the average size of a chunk is 80 KB, which not only reduces the average size of both metadata compared to 4 KB block-level differences, but permitting variable chunk size may also enhance deduplication efficiency in comparison with fixed-size block-level differences.

When the logical layer 214 points to the CAS 212, it points to chunkIDs rather than hash values. This may reduce segment cleaning overhead since searching chunkIDs in a segment to identify live chunks may be faster due to the chunkIDs having contiguous values. Using chunkIDs as the referencing value allows merging adjacent tuples, in some examples, to reduce the size of the chunkID map 220. This is because, in some examples, chunkIDs include an identifier of a particular upload server of the storage management infrastructure 104, which manages the chunks identified by the chunkIDs. This prevents the need for upload servers of the storage management infrastructure 104 to deconflict assigning contiguous numerical ranges for chunkIDs. Upload servers of the storage management infrastructure 104 are described below with respect to FIG. 5. In some examples, if a set of chunks does not have at least a threshold number of contiguous blocks (e.g., 32 blocks of 4 KB, providing a 128 KB sized set), the set is not represented in the hash map 226. This reduces the size of the hash map 226, and results in a deduplication unit size of at least 128 KB.

Referring now to specific data content and organization within the tiered structure 200, the logical layer 214 holds a versioned block map 244, a snapshot map 246, and a deleted snapshot map 248. The CAS 212 holds the chunkID map 220, a delta chunkID map 222, a new chunkID map 224, the hash map 226, and the SUT 400 in the LSM tree 228. The LFS 204 includes multiple log segments, e.g., log segments 206a-206c, that, in some examples, are each approximately 4 MB when stored on the storage system 106. For example, the log segment 206a may have 4 MB of data followed by a variable size metadata portion describing the data. In some examples, the key of the log segment (segID) is set to log/<timestamp>-<id>/data and the segment index is at least a portion of the log prefix. In some examples, each log segment has a different prefix. For example, sample log object names may be log-0000000001/data, log-0000000002/data. Data remains in a particular segment forever until the live data in the segment drops below a threshold, triggering cleaning, so that the cost of moving the live data to a new segment is less expensive than retaining the original segment with the dead data.

The versioned block map 244 maps a logical block number of a snapshot to the CAS 212. In some examples, it takes the format <objID, snapID, LBA>→<chunkID, numBlks>, where numBlks is the number of blocks in a chunk identified by chunkID. With this schema, locating the tuple of a given LBA having the largest snapID value is relatively efficient, because it requires only performing a lookup for objID, LBA, and maximum snapID. The snapshot map 246 lists all snapshots of storage objects. The deleted snapshot map 248 lists all snapshots being deleted.

The chunkID map 220 maps chunkIDs to their location in the LFS 204. In some examples, it takes the format <chunkID>→<segID, numBlks>. Changes to chunkIDs due to a new file difference are stored in the delta chunkID map 222, which enables blind writing to the CAS 212. New uploaded chunkIDs are stored in the new chunkID map 224 before they are merged into the chunkID map 220. In some examples, the hash map 226 takes the format <hash value>→<chunkID>, and may use cuckoo hashing. In some examples, the metadata tier 210 stores at least some of the above-described components in a metadata LFS to record reordering of blocks during segment cleaning. Storing the chunkID map 220 in a metadata LFS enables it to be compressed. By replaying the metadata LFS, metadata may be rebuilt, which may be beneficial for recovery of lost metadata or a change in metadata design or formatting.

Figure 3:
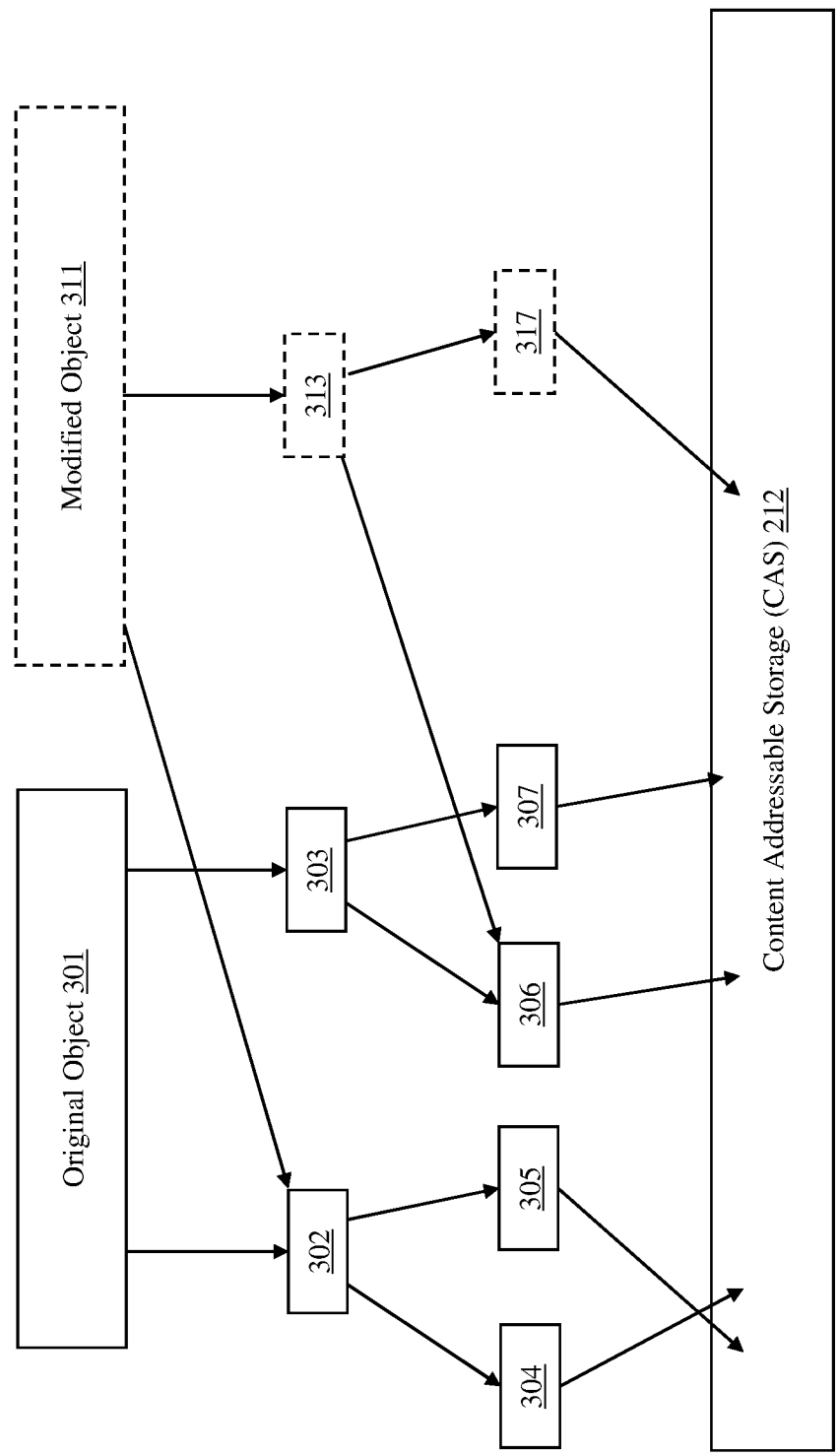
FIG. 3 illustrates how a storage object is broken up into chunks in accordance with an embodiment of the invention.

FIG. 3 illustrates how a storage object is broken up into chunks in accordance with an embodiment of the invention. As shown in FIG. 3, an original object 301 is separated into a portion 302 and a portion 303. The portion 302 is further separated into a portion 304 and a portion 305, and the portion 303 is further separated into a portion 306 and a portion 307. Each of the portions 304-307 may be chunks or sets of chunks. At a later time, the original object 301 is changed into a modified object 311. When generating a snapshot, the difference between the original object 301 and a modified object 311 is stored, rather than the entirety of the modified object 311. As illustrated in FIG. 3, the modified object 311 is separated into the portion 302 (unchanged, and thus common with the original object 301) and a portion 313. The portion 313 is further separated into the portion 306 (unchanged, and thus common with the original object 301) and a portion 317. The portion 317 may be a chunk or a set of chunks. Thus, for the later snapshot, only the portion 317 requires storage, and the modified object 311 may be restored using the portions 304-306 and 317.

Turning now to FIG. 4, the SUT 400 in accordance with an embodiment of the invention is illustrated with additional details. As shown in FIG. 4, the SUT 400 comprises key-value pairs: a segment index 402 and a live block count 404. In some implementations, the SUT 400 may also indicate a total number of blocks (live and dead) in each segment. As used herein, live blocks are blocks that are referenced by one or more storage object snapshots, and thus, are needed to restore those storage object snapshots. In contrast, dead blocks are blocks that are no longer referenced by any storage object snapshots, and thus, are no longer needed. In some examples, the segment index 402, illustrated notionally as 1, 2, . . . N, takes the format <timestamp>-<uploader_ID>, where uploader_ID is a unique identifier of an upload agent in one of the computing environments 102 that uploaded the data, and timestamp is a time stamp of when the data was received by the storage management infrastructure 104. This permits the use of multiple upload agents from one or more of the computing environments 102 without conflict. Upload agents are described below with reference to FIG. 5. In some examples, the segment index 402 of the SUT 400 comprises at least a portion of a log prefix.

The SUT 400 is used to track the space usage of each segment in a storage arrangement, such as the LFS 204, so that segment cleaning candidates may be identified by their live block count 404. As writing progresses, the current segment (to which the next incoming data will be written) circles around. Segment cleaning operations (see FIG. 8) clean out lightly used segments and coalesce their blocks into full or more heavily used segments. If the live block count 404 is zero, indicating that a segment contains no live data, that segment may be overwritten without moving any blocks. Any prior written data in that segment has either already been moved or marked as deleted, and thus, may be overwritten without any loss of data.

Figure 5:
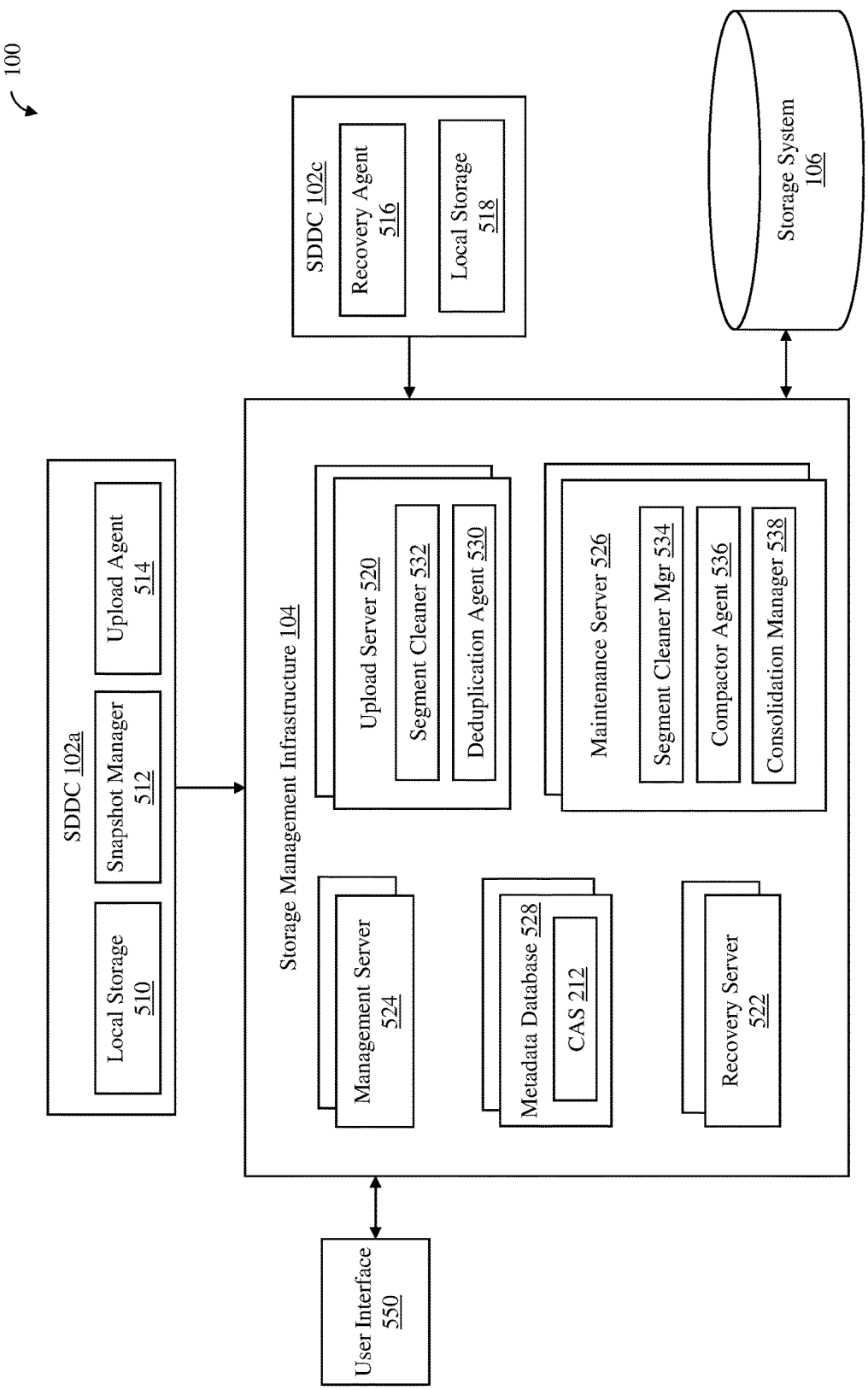
FIG. 5 is a more detailed block diagram of the distributed storage system depicted in FIG. 1 in accordance with an embodiment of the invention.

Turning now to FIG. 5, the distributed storage system 100 is illustrated with additional details in accordance with an embodiment of the invention. In FIG. 5, the computing environment 102a is shown as a primary SDDC and the computing environment 102c is shown as a secondary SDDC, which can be used for disaster recovery of the primary SDDC. Other computing environments of the distributed storage system 100, such as the computing environment 102b, are not illustrated in FIG. 5. The primary and secondary SDDCs 102a and 102c include various software components that are commonly found in an SDDC for computing, networking and storing operations. In addition, as shown in FIG. 5, the primary SDDC 102a includes a local storage 510, a snapshot manager 512 and an upload agent 514, while the secondary SDDC 102c includes a recovery agent 516 and a local storage 518. The storage management infrastructure 104 includes one or more upload servers 520, one or more recovery servers 522, one or more management servers 524, one or more maintenance servers 526 and one or more metadata databases 528. In an embodiment, the metadata databases 528 may be stored in a separate storage accessible by the storage management infrastructure 104, which allows for quick and low-cost access to the metadata in these databases.

The local storage 510 of the primary SDDC 102a can be any storage that are commonly used in an SDDC, such as a virtual SAN. The local storage 510 is used to store data, which can include any storage objects, such as files, file folders, VMDKs and file volumes. The snapshot manager 512 determines block-level differences when a snapshot of a storage object, such as a VMDK or a file volume, is taken.

The data of a storage object includes chunks. In some examples, each chunk has a logical size of 4 kilobytes (KB) so that block differences are 4 KB aligned, although the physical size of the chunk may be smaller than 4 KB due to compression. File level differences may be aligned to byte boundaries, and the chunks for a storage object may be of variable size on byte boundaries. A chunk (or an array of chunks) is a deduplication unit, allowing multiple storage objects to point to common chunks to save space. In some examples, VDFS supports snapshots natively and stores file level differences, leveraging a flexible storage backend and using a versioned object format as its metadata backend. In some examples, write-ahead logs are disabled for VDFS, and VDFS metadata uses a 512-byte block size to reduce the metadata write amplification. In some examples, VDFS file format indicates a list of chunk identifiers (chunkIDs) to directly point to chunks in a content-addressable store (CAS). In some examples, VDFS uses variable size chunking with byte-boundary defined by content so that each chunk is on average 80 KB for enhanced deduplication space saving.

The upload agent 514 of the primary SDDC 102a intakes differences from the snapshot manager 512, and compiles a series of snapshots. In some implementations, each snapshot has a 48-bit identifier (snapID). In some examples, the primary SDDC 102a may have multiple upload agents for scalability. Since multiple primary SDDCs (e.g., the computing environments 102a and 102b) may each have at least one upload agent, a unique identifier may be assigned to each upload agent. In some embodiments, the upload agent 514 sends snapshots (data and metadata) to the upload server 520 of the storage management infrastructure 104. In some examples, to reduce the burden on the upload server 520, the upload agent 514 may send snapshots directly to the storage system 106, bypassing the upload server, and may send only metadata regarding the snapshots to the upload server. In some implementations, the upload agent 514 calculates hash values for blocks of the snapshots, and sends the hash values to the upload server 520. In some embodiments, the storage management infrastructure 104 may have multiple upload servers 520 to communicate with the upload agent 514 at each of the different primary SDDCs, e.g., the primary SDDCs 102a and 102b.

As shown in FIG. 5, the upload server 520 of the storage management infrastructure 104 includes a deduplication agent 530, which compares the received hash values to hashes already included within the hash map 226 in the CAS 212, which is stored in the metadata database 528, to identify duplicates. The upload server 520 identifies the unique hash values to the upload agent 514, which then sends only the blocks of the snapshots that correspond to the unique blocks. The upload server 520 adds the unique hash values of the sent snapshot blocks to the hash map 226. In this manner, the storage management infrastructure 104 performs deduplication of snapshots using the CAS 212. Network acceleration may be achieved by this deduplication, which potentially reduces demand on network bandwidth.

The upload server 520 also comprises a segment cleaner 532, which performs log segment cleaning operation to move live blocks in select log segments to new log segments to save storage costs. Segment cleaning operation performed by the segment cleaner 532 is described below with reference to FIG. 8. In other embodiments, the segment cleaner 532 may be a part of the maintenance server 526, or may be located elsewhere.

The maintenance server 526 includes a segment cleaner manager 534, a compactor agent 536 and a consolidation manager 538. The segment cleaner manager 534 optimizes segment cleaning by balancing the cost of cleaning operations (reads/writes) with the cost of expected recovered storage. The compactor agent 536 manages compaction activities, such as compaction of the LSM tree 228 in the CAS 212. The consolidation manager 538 operates to periodically execute a consolidation operation to significantly reduce read amplification, which is described in detail below. The maintenance server 526 may further include other components to manage snapshots stored in the storage system 106. In some embodiments, there may be multiple maintenance servers 526 in the storage management infrastructure 104, where each maintenance server handles a different primary SDDC.

The management server 524 of the storage management infrastructure 104 implements user-controllable options and configurations provided by a user from a user interface 550, which may be running on any computing component or system. In some embodiments, there may be multiple management servers 524 in the storage management infrastructure 104 to handle multiple users, independently.

The recovery server 522 of the storage management infrastructure 104 manages recovery operations, such as, for example, file restoration operations, failover operations, and failback operations. The recovery server 522 works in conjunction with the recovery agent 516 of the secondary SDDC 102c. The recovery agent 516 leverages the metadata database 528 for disaster recovery. For example, the recovery agent 516 can restore a storage object, e.g., a versioned object or a file volume, from the primary SDDC 102a on the secondary SDDC 102c by reading the metadata database 528 and pulling the needed data (e.g., a corresponding snapshot) from the storage system 106. In some embodiments, there are multiple recovery servers 522 and metadata databases 528 in the storage management infrastructure 104 to handle different primary and secondary SDDCs in the distributed storage system 100.

When pulling the needed data from the storage system 106 to restore a storage object, all the data blocks associated with a snapshot of the storage object need to be retrieved. However, when blocks are stored in the storage system 106 operated by a storage provider, the log segments are stored as storage service objects, e.g., S3 objects in the AWS cloud. If the blocks needed for a snapshot are located in different storage service objects, all the storage service objects must be read to retrieve the needed snapshot blocks. Thus, as the snapshot blocks are stored in more storage service objects, the read operation to retrieve those snapshot blocks is amplified or increased, i.e., more storage service objects must be read, which is commonly referred to as read amplification.

In order to reduce read amplification, the distributed storage system 100 uses at least three techniques. The first technique involves storing storage object snapshots, which may include snapshots of versioned objects and file volumes, in the storage system 106 so that an individual log segment, which may be stored as a single storage service object (e.g., S3 object), contains only the blocks that belong to a single storage object. Thus, blocks for different storage object snapshots are not stored in the same log segment, which means that the blocks for different storage object snapshots are not stored in the same storage service object. This technique places an upper bound on the read amplification to be the total data of a storage object divided by the object size. Without this technique, the read amplification will be unbounded. In some embodiments, the storage service objects are labeled so that the storage object to which the blocks in each storage service object belong is readily apparent. As an example, the names of the storage service objects may follow the following format: objID-segIDx (e.g., obj00005-seg0000001, obj00005-seg0000002, . . . , obj00005-seg0000020). The process of storing or writing storage object snapshots in the storage system 106 in accordance with this technique is described below with respect to FIG. 7.

The second technique to reduce read amplification involves executing segment cleaning operations without mixing blocks for different storage objects so that blocks for different storage objects are not stored in the same new log segment, which means that the blocks for snapshots of different storage objects are not stored in the same storage service object. That is, the blocks for each storage object are treated separately during the segment cleaning operation. In an embodiment where the names of the storage service objects follow the format: objID-segIDx, the names of the storage service objects may be used to identify the blocks that are in the storage service objects during the segment cleaning operation so that blocks of different storage objects are mixed together. The process of cleaning log segments stored in the storage system in accordance with this second technique is described below with respect to FIG. 8.

The third technique to reduce read amplification involves consolidating stored live blocks associated with the latest snapshot of a storage object, such as a VMDK or file volume, that are stored in the storage system 106 into one or more new log segments that are written as storage service objects in the storage system. This technique can be implemented using an algorithm that looks at the versioned block map 244 and the chunkID map 220 for the latest snapshot of a storage object and finds out whether a range of logical address space is too fragmented with respect to the live blocks for the latest snapshot across different log segments, and consequently, different storage service objects in the storage system 106. If the range of logical address space is too fragmented, the data for the latest snapshot in this range is moved together into one or more new log segments and written as one or more new storage service objects in the storage system 106.

Figure 6:
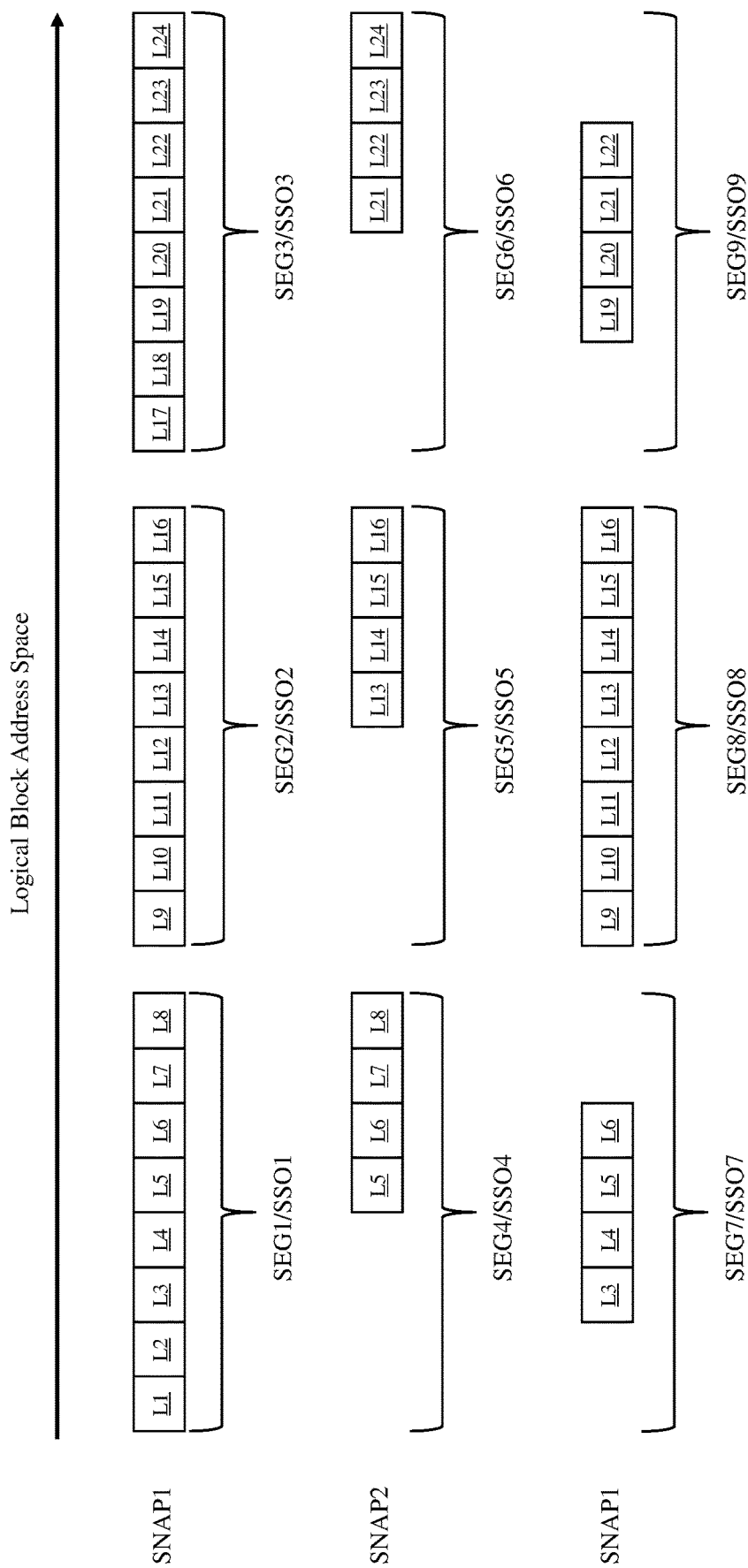
FIG. 6 is an illustration of how one technique is used in the distributed storage system to consolidate stored blocks for the latest snapshot of a storage object in accordance with an embodiment of the invention.

FIG. 6 is an illustration of how the third technique is used in the distributed storage system 100 to consolidate stored blocks for the latest snapshot of a storage object using a simplified example in accordance with an embodiment of the invention. In this simplified example, there are three snapshots SNAP1, SNAP2 and SNAP3 of a storage object, such as a VMDK, that have blocks within an LBA range of L1-L24. The first snapshot SNAP1 has 24 blocks within this LBA range. Thus, the blocks of the first snapshot SNAP1 are contiguous for the illustrated LBA range of L1-L24. In this example, it is assumed that there are eight blocks in each log segment. Thus, the eight blocks of the first snapshot SNAP1 within the LBA range of L1-L8 are stored in a log segment SEG1, which is written as a storage service object SSO1, e.g., an S3 object, in the storage system 106. Similarly, the eight blocks of the first snapshot SNAP1 within the LBA range of L9-L16 are stored in another log segment SEG2 and the eight blocks of the first snapshot SNAP1 within the LBA range of L17-L24 are stored in another log segment SEG3, which are both written as two corresponding storage service objects SSO2 and SSO3, respectively, in the storage system 106.

The second snapshot SNAP2 has 12 blocks within the LBA range of L1-L24. These 12 blocks of the second snapshot SNAP2 correspond to LBAs L5-L8, L13-L16 and L21-24. Since the snapshots are stored using a log-structured file system in the distributed storage system 100, the blocks of the second snapshot SNAP2 are placed in one or more log segments, which are different than the log segments SEG1-SEG3. In this simplified example, it is assumed that the four blocks of the second snapshot SNAP2 within the LBA range of L5-L8 are stored in a log segment SEG4, which is written as a storage service object SSO4 in the storage system. Similarly, the four blocks of the second snapshot SNAP2 within the LBA range of L13-L16 are stored in another log segment SEG5 and the four blocks of the second snapshot SNAP2 within the LBA range of L21-L24 are stored in another log segment SEG6, which are both written as two corresponding storage service objects SSO5 and SSO6, respectively, in the storage system 106.

The third snapshot SNAP3 has 16 blocks within the LBA range of L1-L24. These 16 blocks of the third snapshot SNAP3 correspond to LBAs L3-L6, L9-L16 and L19-22. Again, since the snapshots are stored using a log-structured file system in the distributed storage system 100, the blocks of the third snapshot SNAP3 are placed in one or more log segments, which are different than the log segments SEG1-SEG6. In this simplified example, it is assumed that the four blocks of the third snapshot SNAP3 within the LBA range of L3-L6 are stored in a log segment SEG7, which is written as a storage service object SSO7 in the storage system 106. Similarly, the eight blocks of the third snapshot SNAP3 within the LBA range of L9-L16 are stored in another log segment SEG8 and the four blocks of the third snapshot SNAP3 within the LBA range of L19-L22 are stored in another log segment SEG5, which are both written as two corresponding storage service objects SSO8 and SSO9, respectively, in the storage system 106.

In this example, in order to restore the storage object using the latest snapshot, i.e., the third snapshot SNAP3, the blocks of first snapshot SNAP1 that have not been modified by either the second snapshot SNAP2 or the third snapshot SNAP3 are needed, as well as the blocks of second snapshot SN2 that have not been modified by the third snapshot SN3. Thus, blocks with LBAs L1, L2, L17 and L18 of the first snapshot SNAP1, and blocks with LBAs L7, L8, L22 and L23 of the second snapshot SNAP2, as well as all the blocks of the third snapshot SNAP3 (i.e., blocks with LBAs L3-L6, L9-L16 and L19-L22) are needed to restore the storage object at the state of the third snapshot. However, these blocks that are needed for the third snapshot SN3 are stored in nine different log segments SEG1-SEG9 that are written as nine different storage service objects. This means that all nine storage service objects must be read to retrieve all the blocks that are needed to restore the storage object back to a state when the third snapshot SN3 was taken. This read amplification can be reduced if some of these blocks that are needed for the third snapshot SNAP3 can be consolidated into fewer than nine storage service objects.

In an embodiment, the consolidation process involves identifying all the blocks that are needed for the third snapshot SN3. This can be achieved by searching through the versioned block map 244 to find chunk IDs corresponding to the LBAs for the third snapshot SN3. In one implementation, the versioned block map 244 points to a particular chunk ID of a block for each logical block address of a snapshot that needs that block. Thus, if only one snapshot needs a particular block, then the chunk ID of that block is mapped to only that snapshot. However, if multiple snapshots need the same particular block, then the chunk ID of that block is mapped to the multiple snapshots. For example, in the example shown in FIG. 6, the block for LBA of L1 is needed for each of three snapshots SNAP1, SNAP2 and SNAP3. Thus, the chunk ID of this block will be mapped to all three snapshots SNAP1, SNAP2 and SNAP3. Therefore, all the chunk IDs needed for a specific snapshot, e.g., the third snapshot SNAP3, can be readily found using the versioned block map 244. This process can be viewed as merging all the snapshots of a LBA range of a versioned object, e.g., the storage object corresponding to the latest snapshot, to get a set of chunk IDs for that versioned object.

After the set of chunk IDs for the third snapshot SNAP3 has been identified, the segments IDs of the set of chunk IDs and the number of blocks in each of these log segments are ascertained using the chunkID map 220 in the CAS 212. Then, for each log segment, it is determined whether the blocks corresponding to the chunkIDs in the log segment should be consolidate with blocks in other log segments for the third snapshot SNAP3, which is accomplished by comparing the number of blocks in the log segment (seg.numBlks) and the size of the log segment (seg.size). If this comparison satisfies a certain criterion, then the blocks needed for the third snapshot SNAP3 contained in that log segment are consolidated with blocks needed for the third snapshot SN3 contained in one or more other log segments. In a particular implementation, if the number of blocks needed for the third snapshot SNAP3 in a log segment divided by the size of the log segment is less than a predetermined consolidation threshold, then the blocks in the log segment are flagged as candidate blocks for consolidation. The consolidation threshold may be predetermined using empirical analysis. In the example illustrated in FIG. 6, if the log segments SEG4 and SEG6 satisfy the threshold criterion, then the blocks needed for the third snapshot SNAP3 in these log segments SEG4 and SEG6 are determined to be candidate blocks and may be consolidated in a single new log segment and stored as a new storage service object in the storage system 106. Thus, when the storage object is restored using the third snapshot SNAP3, fewer storage service objects must be read to retrieve all the blocks needed for the third snapshot.

In this fashion, the consolidation process is periodically executed to consolidate blocks for the latest snapshot of a storage object. Simulation shows that after such periodical consolidation, the read amplification is reduced by 75% or more and that the additional S3 API cost and storage is marginal.

The consolidation process described above can be executed using an algorithm, which is represented by the following pseudo code:

```
def ConsolidateSnapshot( ):
    merge all snapshots of the LBA range of the Versioned
        Object to get set of chunkIds
    find out the segment ids of the set of chunkIds and
        number of blocks in each segment
    if seg.numBlks/seg.size<consolidation threshold:
        move all blocks in this segment that belong to the
            latest snapshot to a new segment.
```

Figure 7:
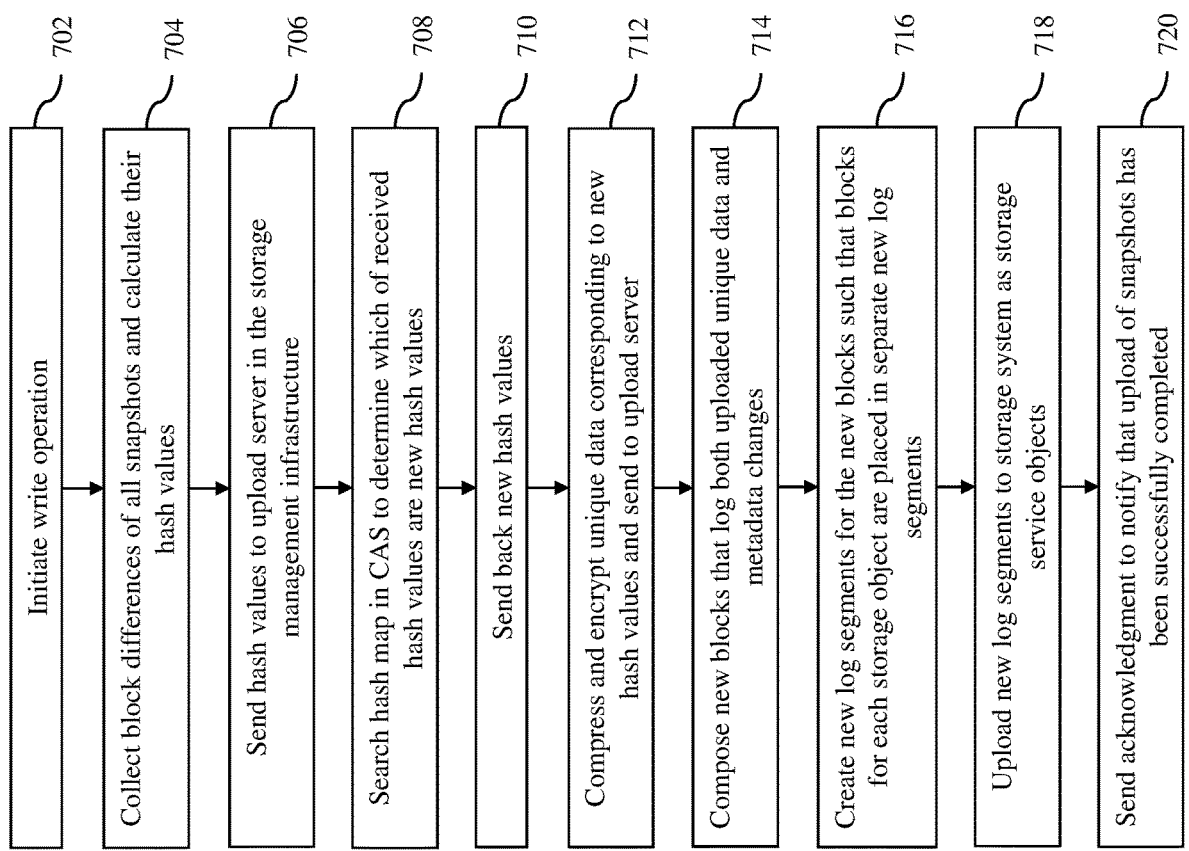
FIG. 7 is a flow diagram of a process for storing storage object snapshots from a source computing environment to a storage system using a storage management infrastructure of the distributed storage system to reduce read amplification in accordance with an embodiment of the invention.

FIG. 7 is a flow diagram of a process for storing a storage object snapshot from a source computing environment, e.g., the source SDDC 102a, to the storage system 106 using the storage management infrastructure 104 to reduce read amplification in accordance with an embodiment of the invention. The process begins at step 702, where a write operation is initiated by the uploader agent 514 running at the source computing environment. The write operation may be initiated periodically to write block differences for all the snapshots of storage objects taken since the last write operation for the source computing environment.

Next, at step 704, the block differences of all the snapshots are collected and their hash values are calculated by the uploader agent 514 of the source computing environment. Next, at step 706, all the hash values are sent to the upload server 520 in the storage management infrastructure 104 from the uploader agent 514 in the source computing environment.

Next, at step 708, the hash map 226 in the CAS 212 is searched by the upload server 520 in the storage management infrastructure 104 to determine which of the received hash values of the block differences cannot be found in the hash map to determine which of the received hash values are new hash values. The block differences corresponding to the new hash values are unique blocks or data that need to be stored. In an embodiment, a cached bloom filter may be used to speed up the search. Next, at step 710, all the hash values that cannot be found in the hash map 226 in the CAS 212, i.e., new has values, are sent back to the uploader agent 514 from the upload server 520.

Next, at step 712, the unique data corresponding to the new hash values is compressed and encrypted by the uploader agent 514, and then sent to the upload server 520 in the storage management infrastructure 104.

Next, at step 714, new blocks that log both the uploaded unique data and metadata changes (e.g., insertion or deletion) are composed by the upload server 520. Next, at step 716, new log segments are created for the new blocks by the upload server 520 such that blocks for each storage object are placed in separate new log segments. That is, blocks for different storage objects are not placed in the same new log segment. In some embodiments, the new log segments are named so that the storage object corresponding to the blocks included in each log segment can be quickly identified.

Next, at step 718, the new log segments are uploaded to the storage system 106 as storage service objects by the upload server 520. If the storage system 106 is Amazon S3, then each new log segment is uploaded as a storage service object in the form of an S3 object. Next, at step 720, an acknowledgment is sent to the uploader agent 514 from the upload server 520 to notify that the upload of the snapshots has been successfully completed.

Since blocks for snapshots of different storage objects are not stored in the same log segment (and consequently not in the same storage service object), the read amplification may be reduced by placing an upper bound for the read amplification.

Figure 8:
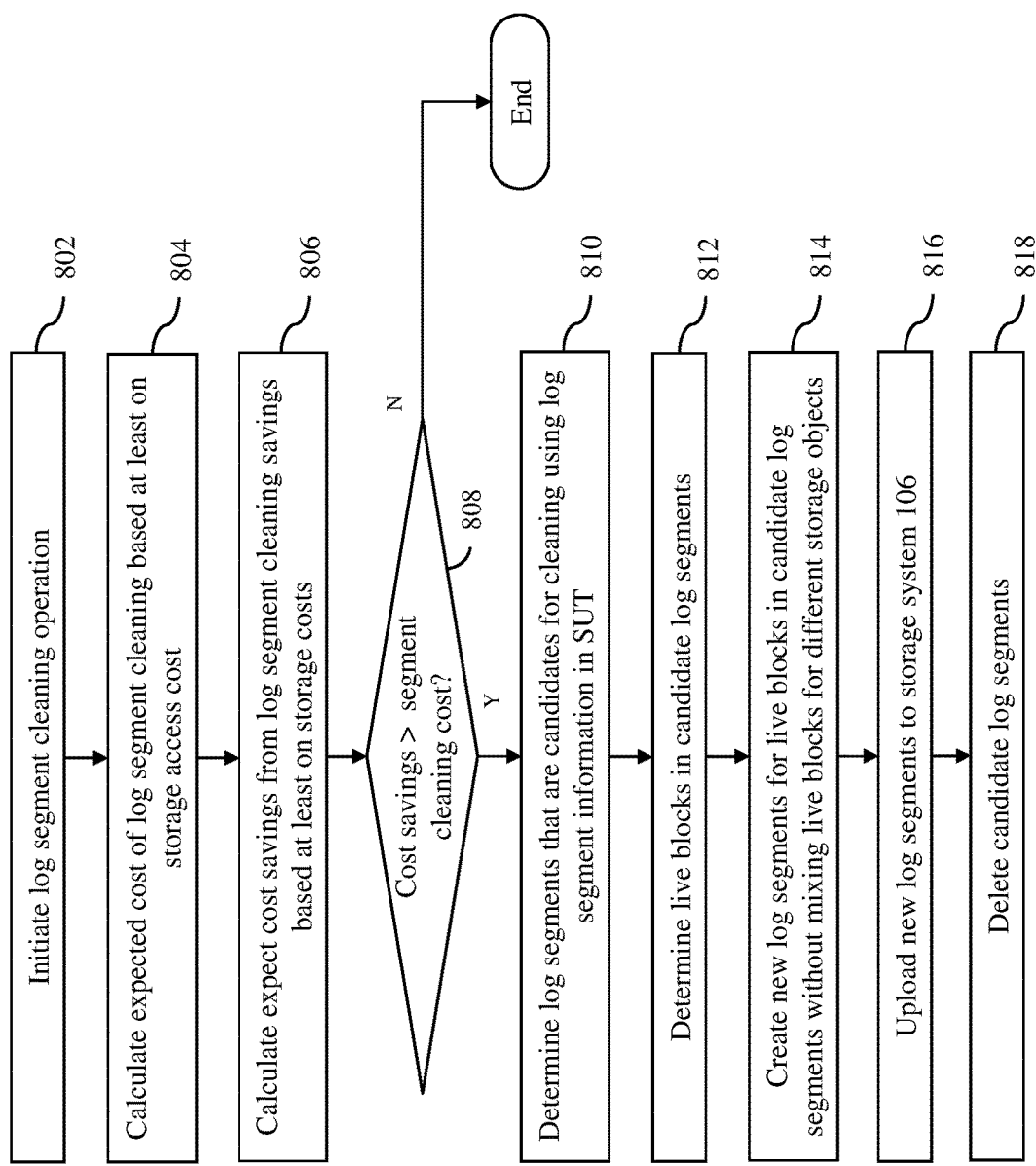
FIG. 8 is a flow diagram of a process for cleaning log segments stored in the storage system as storage service objects using the storage management infrastructure to reduce read amplification in accordance with an embodiment of the invention.

FIG. 8 is a flow diagram of a process for cleaning log segments stored in the storage system 106 as storage service objects using the storage management infrastructure 104 to reduce read amplification in accordance with an embodiment of the invention. The process begins at step 802, where a log segment cleaning operation is initiated by the segment cleaner 532 in the storage management infrastructure 104. The log segment cleaning operation may be automatically initiated periodically, e.g., daily or weekly, to free log segments to save storage costs.

Next, at step 804, an expected cost of log segment cleaning is calculated by the segment cleaner manager 534 based at least on storage access cost. Next, at step 806, an expected cost savings from the log segment cleaning is calculated by the segment cleaner manager 534 based at least on storage costs. In some implementations, the segment cleaner manager 534 may have an artificial intelligence (AI)

or machine learning (ML) component to perform these calculations using historical data as a basis for estimates in the calculations.

Next, at step 808, a determination is made by the segment cleaner 532 whether to proceed with the log segment cleaning based on at least the calculated cost of log segment cleaning and the calculated log segment cleaning cost savings. For example, only if the calculated log segment cleaning cost savings is greater than the calculated cost of segment cleaning by some threshold, then it is determined to proceed with the log segment cleaning. If it is determined to not proceed with the log segment cleaning, then the process comes to an end. However, if it is determined to proceed with the segment cleaning, then the process proceeds to step 810.

Next, at step 810, log segments that are candidates for cleaning are determined by the segment cleaner 532 using log segment information in the SUT 400. These candidate log segment may be determined using the number or percentage of live blocks in the segments. For example, a threshold of 30% or 50% of live blocks may be used to determine the candidate log segments. If a threshold of 30% of live blocks is used, then log segments with 30% or less live blocks may be determined to be candidate log segments. If a threshold of particular number of live blocks is used, then log segments having less than or equal to a threshold number of live blocks may be determined to be candidate log segments. In some implementations, the segment cleaner 532 may use AI or ML to select one or more cleaning candidate criteria, e.g., the threshold percentage of live blocks.

Next, at step 812, the live blocks in the candidate log segments are determined by the segment cleaner 532. In an embodiment, the chunkID map 220 in the CAS 212 is used to determine which blocks in the candidate log segments are live.

Next, at step 814, new log segments are created for the live blocks of the candidate log segments by the segment cleaner 532 without mixing live blocks for different storage objects. That is, the live blocks for each storage object are placed in separate new log segments. Thus, live blocks for different storage objects are not placed in the same new log segment. In some embodiments, the names of the existing log segments are used to ensure that live blocks that belong to different storage objects are not placed in the same new log segment.

Next, at step 816, the new log segments are uploaded (or written) to the storage system 106 by the upload server 520. If the storage system 106 is Amazon S3, then each new log segment is uploaded as a storage service object in the form of an S3 object. Since each new log segment includes only the live blocks for a particular storage object, read amplification is reduced.

Next, at step 818, the candidate log segments, i.e., the log segments that were determined to be cleaning candidates, are deleted by the segment cleaner 532 since these the candidate log segments are no longer needed. In some implementations, the actual data of the candidate log segments may remain on the physical media even when the candidate log segments have been deleted until it is overwritten. The process then comes to an end.

Figure 9:
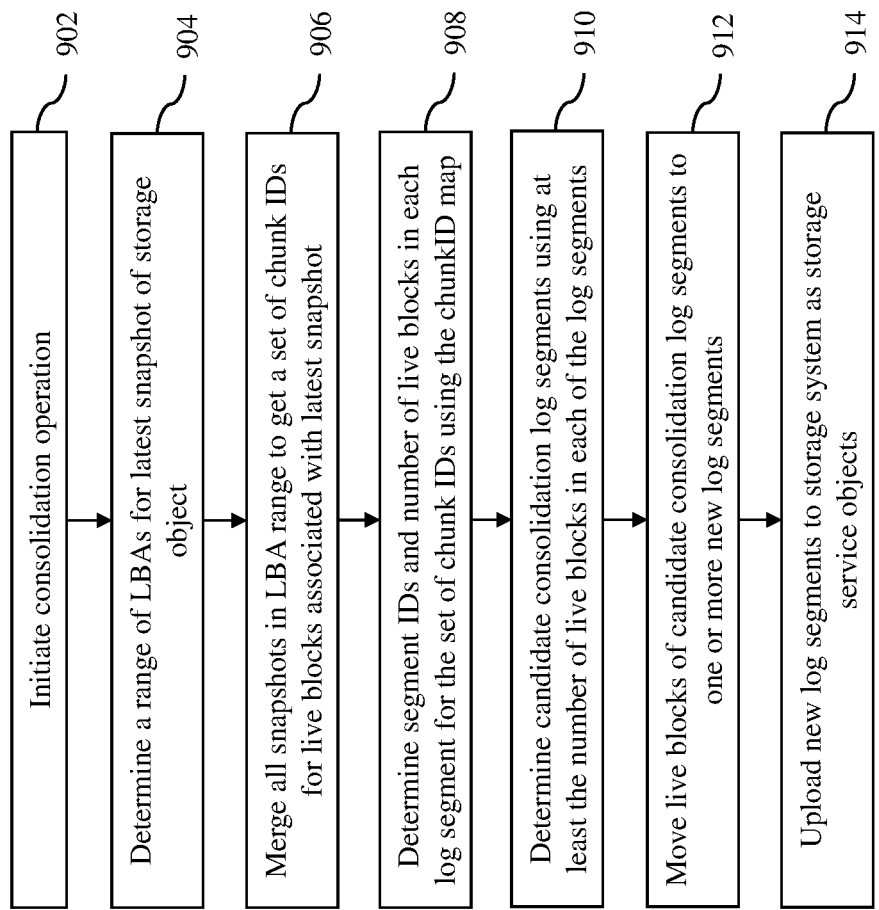
FIG. 9 is a flow diagram of a process for consolidating blocks for the latest snapshots of storage objects into new log segments using the storage management infrastructure to reduce read amplification in accordance with an embodiment of the invention.

FIG. 9 is a flow diagram of a process for consolidating blocks for the latest snapshots of storage objects into new log segments using the storage management infrastructure 104 to reduce read amplification in accordance with an embodiment of the invention. The process begins at step 902, where a consolidation operation is initiated by the snapshot consolidator 538. The consolidation operation may be automatically initiated periodically, e.g., daily or weekly.

Next, at step 904, a range of LBAs for the latest snapshot of a storage object, such as a VMDK, is determined by the snapshot consolidator 538. In an embodiment, this range of LBAs is determined using the versioned block map 244, which specifies the LBAs for the all the snapshots of the storage object, including the latest snapshot.

Next, at step 906, all the snapshots in the range of LBAs are merged by the snapshot consolidator 538 to get a set of chunk IDs for the live blocks associated with the latest snapshot. The live blocks associated with the latest snapshot of the storage object are all the live blocks that belong to the latest snapshot and all the live blocks that belong to earlier or older snapshots of the storage object, which are needed to restore the storage object to a state when the latest snapshot was taken. In an embodiment, all the chunk IDs for the live blocks associated with the latest snapshot are retrieved from the versioned block map 244.

Next, at step 908, the segment IDs and the number of live blocks in each of the log segments corresponding to the segment IDs for the set of chunk IDs are determined by the snapshot consolidator 538 using the chunkID map 220 in the CAS 212. The determined segment IDs correspond to log segments that contain any of the live blocks corresponding to the set of chunk IDs.

Next, at step 910, candidate consolidation log segments are determined by the snapshot consolidator 538 using at least the number of live blocks in each of the log segments corresponding to the segment IDs found for the set of chunk IDs. In an embodiment, a log segment is determined to be a candidate consolidation log segment if the number of blocks in the log segment (seg.numBlks) divided by the size of the log segment (seg.size) is less than a consolidation threshold, or if seg.numBlks/seg.size<consolidation threshold. The consolidation threshold may be predetermined using empirical analysis. In an embodiment, the size of each log segments is stored in the appropriate metadata database 528 when the log segments are composed.

Next, at step 912, the live blocks of the candidate consolidation log segments, which are needed for the latest snapshot, are moved to one or more new log segments by the snapshot consolidator 538. That is, one or more new log segments are created using the live blocks of the candidate consolidation log segments in order to consolidate the live blocks in the new log segments. In addition, the metadata for the latest snapshot is updated to reflect the live blocks in the new log segments.

Next, at step 914, the new log segments are uploaded (written) to the storage system 106 as new storage service objects. If the storage system 106 is Amazon S3, then each new log segment is uploaded as an S3 object. Thus, blocks that were previously stored in multiple storage service objects, e.g., multiple S3 objects, are now consolidated into fewer storage service objects, which reduces read amplification.

Figure 10:
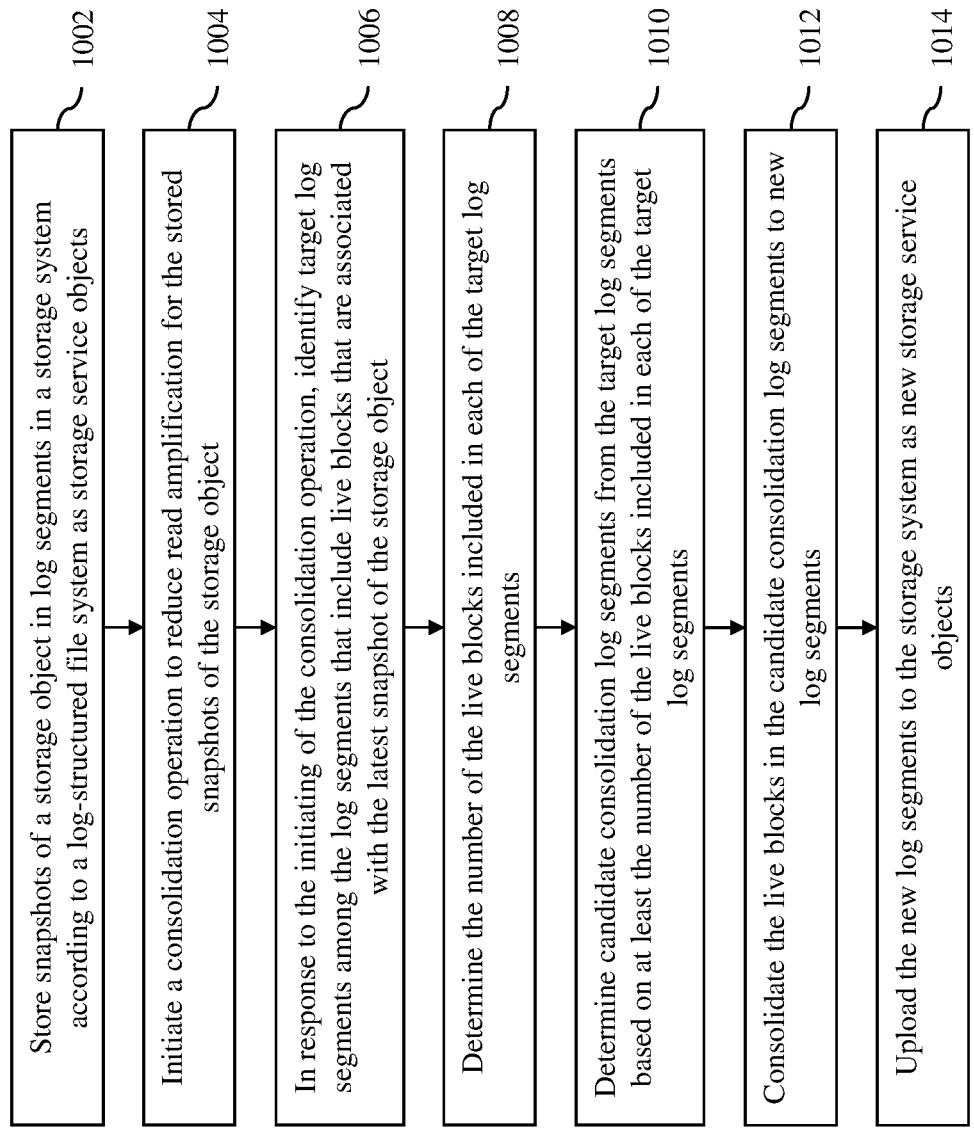
FIG. 10 is a flow diagram of a computer-implemented method for managing snapshots of storage objects in a storage system in accordance with an embodiment of the invention.

A computer-implemented method for managing snapshots of storage objects in a storage system in accordance with an embodiment of the invention is described with reference to a flow diagram of FIG. 10. At block 1002, snapshots of a storage object are stored in log segments in the storage system according to a log-structured file system as storage service objects. At block 1004, a consolidation operation is initiated to reduce read amplification for the stored snapshots of the storage object. At block 1006, in response to the initiating of the consolidation operation, target log segments among the log segments are identified that include live blocks that are associated with the latest snapshot of the storage object. At block 1008, the number of the live blocks included in each of the target log segments is determined. At block 1010, candidate consolidation log segments are determined from the target log segments based on at least the number of the live blocks included in each of the target log segments. At block 1012, the live blocks in the candidate consolidation log segments are consolidated to new log segments. At block 1014, the new log segments are uploaded to the storage system as new storage service objects.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, non-volatile memory, NVMe device, persistent memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing snapshots of storage objects in a storage system, the method comprising:
 storing snapshots of a storage object in log segments in the storage system according to a log-structured file system as storage service objects;
 initiating a consolidation operation to reduce read amplification for the stored snapshots of the storage object;
 in response to the initiating of the consolidation operation, identifying target log segments among the log segments that include live blocks that are associated with the latest snapshot of the storage object;
 determining the number of the live blocks included in each of the target log segments;
 determining candidate consolidation log segments from the target log segments based on at least the number of the live blocks included in each of the target log segments;
 consolidating the live blocks in the candidate consolidation log segments to new log segments; and
 uploading the new log segments to the storage system as new storage service objects.

2. The method of claim 1, further comprising:
retrieving a set of chunk identifications (IDs) corresponding to the live blocks that are needed for the latest snapshot of the storage object for a range of logical block addresses;
searching a chunk ID map for segment IDs for the set of chunk IDs that correspond to the target log segments; and
searching the chunk ID map for the number of the live blocks included in each of the target log segments.

3. The method of claim 2, wherein retrieving the set of chunk IDs corresponding to the live blocks includes retrieving the set of chunk IDs corresponding to the live blocks that belong to snapshots of the storage object that are older than the latest snapshot of the storage object and are needed to restore the storage object to a state when the latest snapshot of the storage object was taken.

4. The method of claim 1, wherein determining the candidate consolidation log segments from the target log segments includes, for each target log segment, determining that the target log segment is a candidate consolidation log segment when the number of the live blocks in the target log segment divided by a size of the target log segment is less than a consolidation threshold.

5. The method of claim 1, wherein the storage object is a virtual machine disk (VMDK) and the storage service objects are S3 objects.

6. The method of claim 1, wherein storing the snapshots of the storage object in the log segments in the storage system includes storing exclusively the snapshots of the storage object in the log segments in the storage system such that no snapshot of another storage object is stored in any of the log segments.

7. The method of claim 6, further comprising labeling a particular log segment of the log segments with a name that includes a storage object identification and a segment identification, the storage object identification indicating that the particular log segment exclusively includes blocks of the snapshots of the storage object.

8. The method of claim 6, further comprising:
initiating a log segment cleaning operation;
in response to the initiating of the log segment cleaning operation, selecting candidate log segments for log segment cleaning based on all live blocks in the candidate log segments;
creating additional log segments for all the live blocks in the candidate log segments for log segment cleaning without mixing any live blocks for snapshots of different storage objects in the same additional log segment; and
uploading the additional log segments to the storage system as additional storage service objects.

9. A non-transitory computer-readable storage medium containing program instructions for managing snapshots of storage objects in a storage system, wherein execution of the program instructions by one or more processors of a computer system causes the one or more processors to perform steps comprising:
storing snapshots of a storage object in log segments in the storage system according to a log-structured file system as storage service objects;
initiating a consolidation operation to reduce read amplification for the stored snapshots of the storage object;
in response to the initiating of the consolidation operation, identifying target log segments among the log segments that include live blocks that are associated with the latest snapshot of the storage object;
determining the number of the live blocks included in each of the target log segments;
determining candidate consolidation log segments from the target log segments based on at least the number of the live blocks included in each of the target log segments;
consolidating the live blocks in the candidate consolidation log segments to new log segments; and
uploading the new log segments to the storage system as new storage service objects.

10. The computer-readable storage medium of claim 9, wherein the steps further comprise:
retrieving a set of chunk identifications (IDs) corresponding to the live blocks that are needed for the latest snapshot of the storage object for a range of logical block addresses;
searching a chunk ID map for segment IDs for the set of chunk IDs that correspond to the target log segments; and
searching the chunk ID map for the number of the live blocks included in each of the target log segments.

11. The computer-readable storage medium of claim 10, wherein retrieving the set of chunk IDs corresponding to the live blocks includes retrieving the set of chunk IDs corresponding to the live blocks that belong to snapshots of the storage object that are older than the latest snapshot of the storage object and are needed to restore the storage object to a state when the latest snapshot of the storage object was taken.

12. The computer-readable storage medium of claim 9, wherein determining the candidate consolidation log segments from the target log segments includes, for each target log segment, determining that the target log segment is a candidate consolidation log segment when the number of the live blocks in the target log segment divided by a size of the target log segment is less than a consolidation threshold.

13. The computer-readable storage medium of claim 9, wherein the storage object is a virtual machine disk (VMDK) and the storage service objects are S3 objects.

14. The computer-readable storage medium of claim 9, wherein storing the snapshots of the storage object in the log segments in the storage system includes storing exclusively the snapshots of the storage object in the log segments in the storage system such that no snapshot of another storage object is stored in any of the log segments.

15. The computer-readable storage medium of claim 14, further comprising labeling a particular log segment of the log segments with a name that includes a storage object identification and a segment identification, the storage object identification indicating that the particular log segment exclusively includes blocks of the snapshots of the storage object.

16. The computer-readable storage medium of claim 14, wherein the steps further comprise:
initiating a log segment cleaning operation;
in response to the initiating of the log segment cleaning operation, selecting candidate log segments for log segment cleaning based on all live blocks in the candidate log segments;
creating additional log segments for all the live blocks in the candidate log segments for log segment cleaning without mixing any live blocks for snapshots of different storage objects in the same additional log segment; and
uploading the additional log segments to the storage system as additional storage service objects.

17. A system comprising:
memory; and
at least one processor configured to:
  store snapshots of a storage object in log segments in a storage system according to a log-structured file system as storage service objects;
  initiate a consolidation operation to reduce read amplification for the stored snapshots of the storage object;
  in response to initiating of the consolidation operation, identify target log segments among the log segments that include live blocks that are associated with the latest snapshot of the storage object;
  determine the number of the live blocks included in each of the target log segments;
  determine candidate consolidation log segments from the target log segments based on at least the number of the live blocks included in each of the target log segments;
  consolidate the live blocks in the candidate consolidation log segments to new log segments; and
  upload the new log segments to the storage system as new storage service objects.

18. The system of claim 17, wherein the at least one processor is further configured to:
  retrieve a set of chunk identifications (IDs) corresponding to the live blocks that are needed for the latest snapshot of the storage object for a range of logical block addresses;
  search a chunk ID map for segment IDs for the set of chunk IDs that correspond to the target log segments; and
  search the chunk ID map for the number of the live blocks included in each of the target log segments.

19. The system of claim 18, wherein the at least one processor is configured to retrieve the set of chunk IDs corresponding to the live blocks that belong to snapshots of the storage object that are older than the latest snapshot of the storage object and are needed to restore the storage object to a state when the latest snapshot of the storage object was taken.

20. The system of claim 17, wherein the at least one processor is configured to, for each target log segment, determine that the target log segment is a candidate consolidation log segment when the number of the live blocks in the target log segment divided by a size of the target log segment is less than a consolidation threshold.

* * * * *